United States Patent

Robertson

[15] 3,659,810
[45] Feb. 5, 1972

[54] INHERENTLY STABLE TAPERED WING FLAPERON AIRPLANE

[72] Inventor: James L. Robertson, 15400 Sunset Hwy., Bellevue Airfield, Bellevue, Wash.

[22] Filed: Mar. 10, 1970

[21] Appl. No.: 23,113

Related U.S. Application Data

[62] Division of Ser. No. 730,516, May 20, 1968, Pat. No. 3,539,133.

[52] U.S. Cl. .................... 244/76 R, 244/83 R, 244/42 DA
[51] Int. Cl. ................................................. B64c 13/04
[58] Field of Search ............ 244/77 F, 75, 83 R, 83 C, 83 D, 244/89, 76 R, 42 AA

[56] References Cited

UNITED STATES PATENTS

| | | | |
|---|---|---|---|
| 1,886,932 | 11/1932 | Andersson | 244/83 C |
| 1,406,617 | 2/1922 | Dalton | 244/83 C |
| 1,822,782 | 9/1931 | Novo | 244/83 C |
| 2,494,208 | 1/1950 | Schultz | 244/90 A |
| 1,830,429 | 11/1931 | Elsby, Jr | 244/83 C |

*Primary Examiner*—Milton Buchler
*Assistant Examiner*—Jeffrey L. Forman
*Attorney*—Seed, Berry, Dowrey & Cross

[57] ABSTRACT

Flaperon-actuating linkage is moved by flap-actuating means to coordinate flaperon droop with flap deflection so that initially the flaperon droop increases with flap deflection and, subsequently, the flaperon droop decreases as flap deflection continues to increase. The wing panels ahead of the flaperons are tapered in planform and their leading edges are more blunt and rounded than the leading edge portions of the wing inboard from such panels, such outboard leading edge portions provide high-lift and postpone stall at the high angles of attack of the outboard wing panels resulting from downward deflection of a flaperon from its maximum drooped position. Jaw cranks connect flaperon push rods to both the flap-controlled flaperon droop setting means and the flaperon differential deflection control means. To lighten nose-up control forces when the flaps and flaperons are deflected, flap deflection stresses springs opposing down-springing loading on the elevators. A fence is aligned with the inboard end of each flaperon.

9 Claims, 23 Drawing Figures

Patented May 2, 1972
BEST AVAILABLE COPY
3,659,810
7 Sheets-Sheet 1
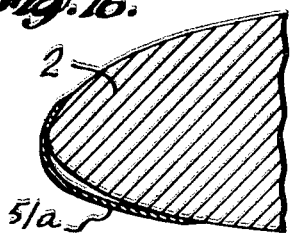
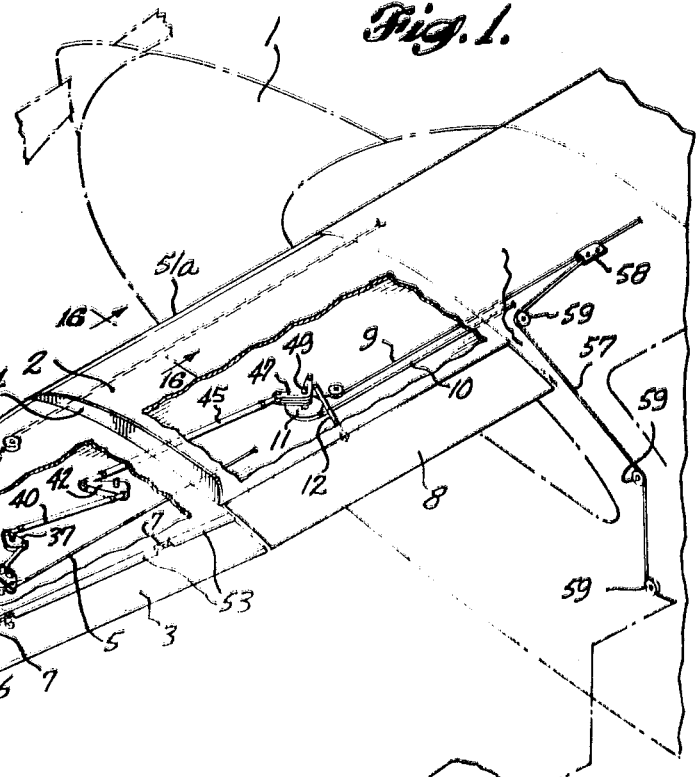
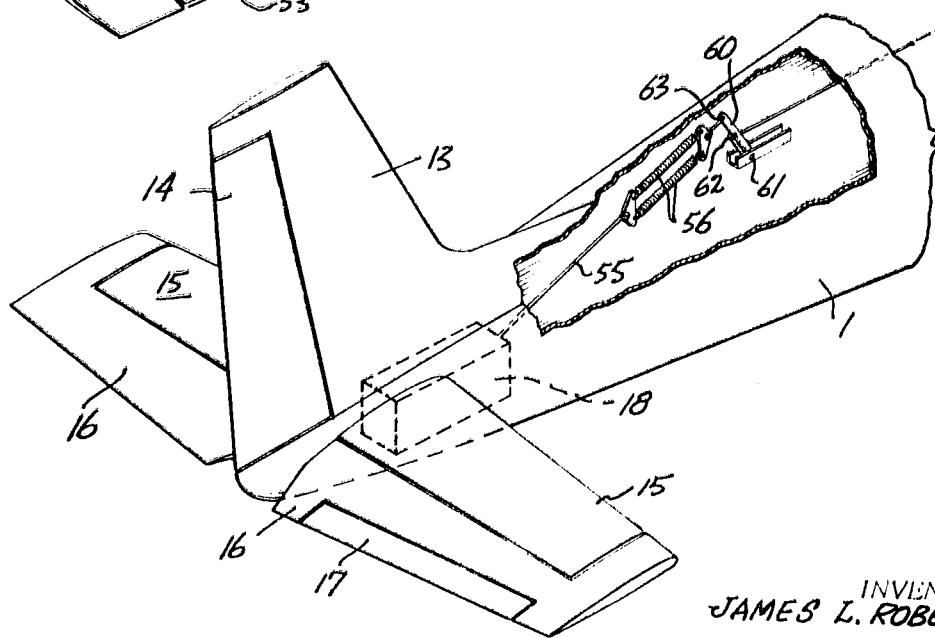
INVENTOR
JAMES L. ROBERTSON

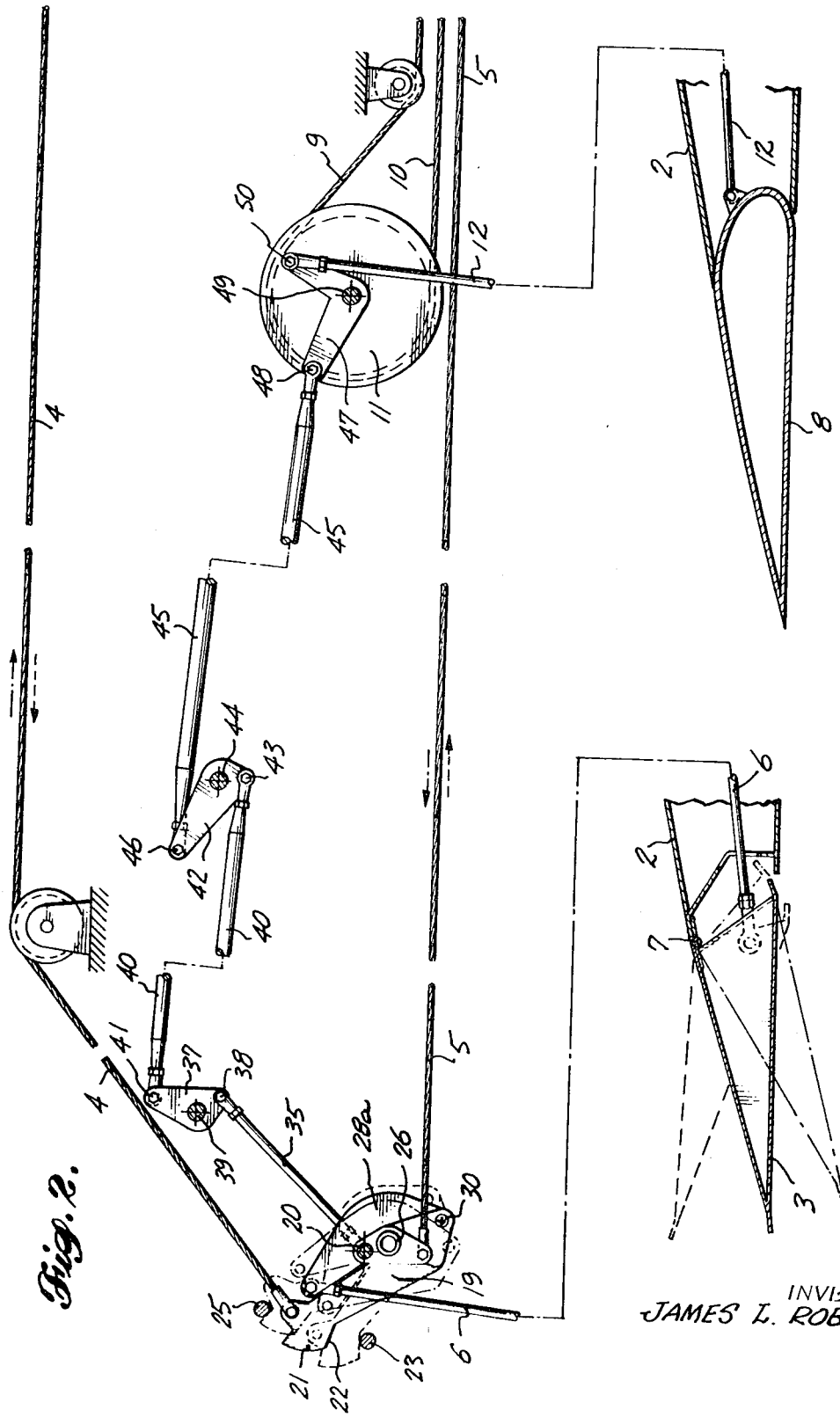

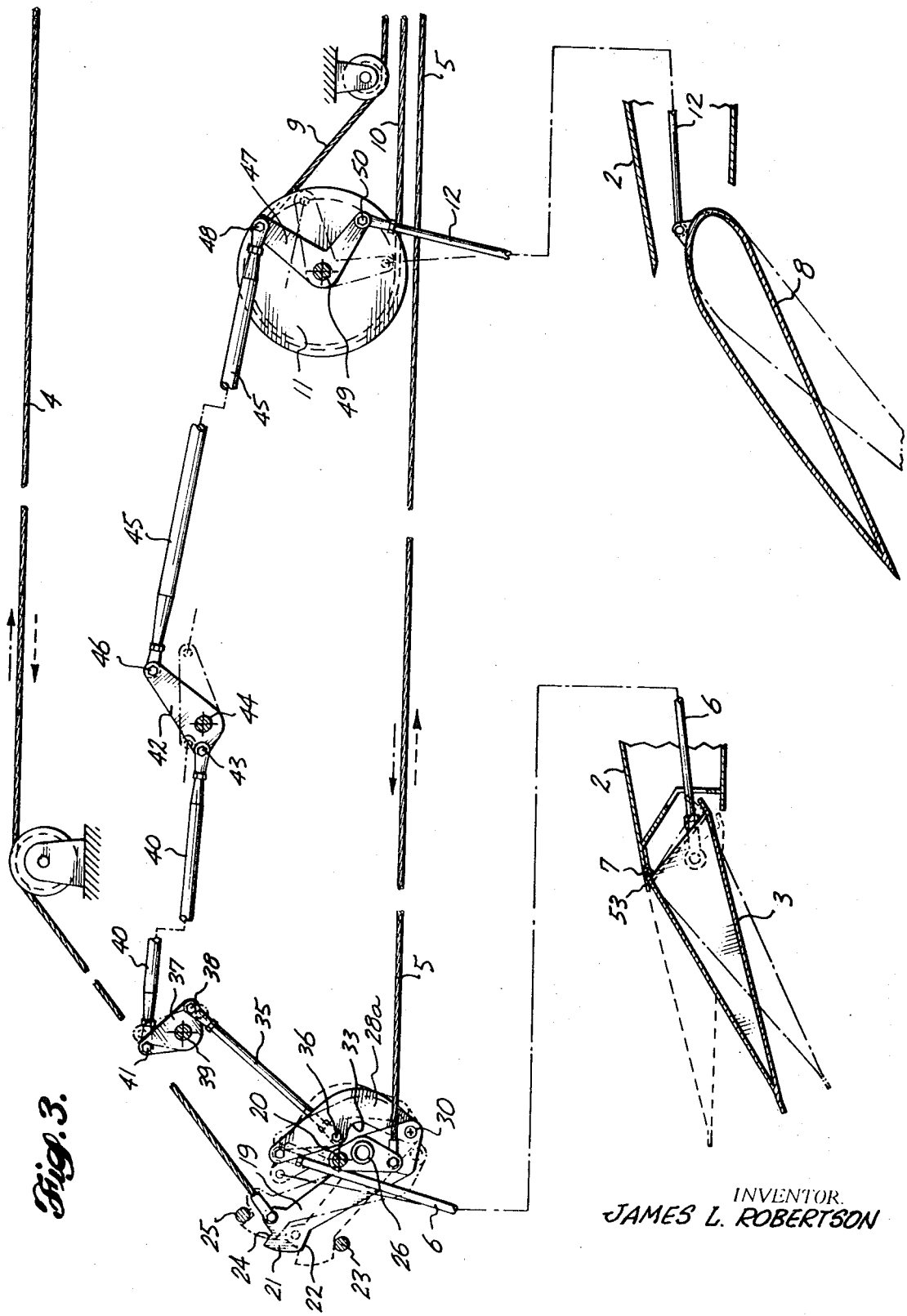

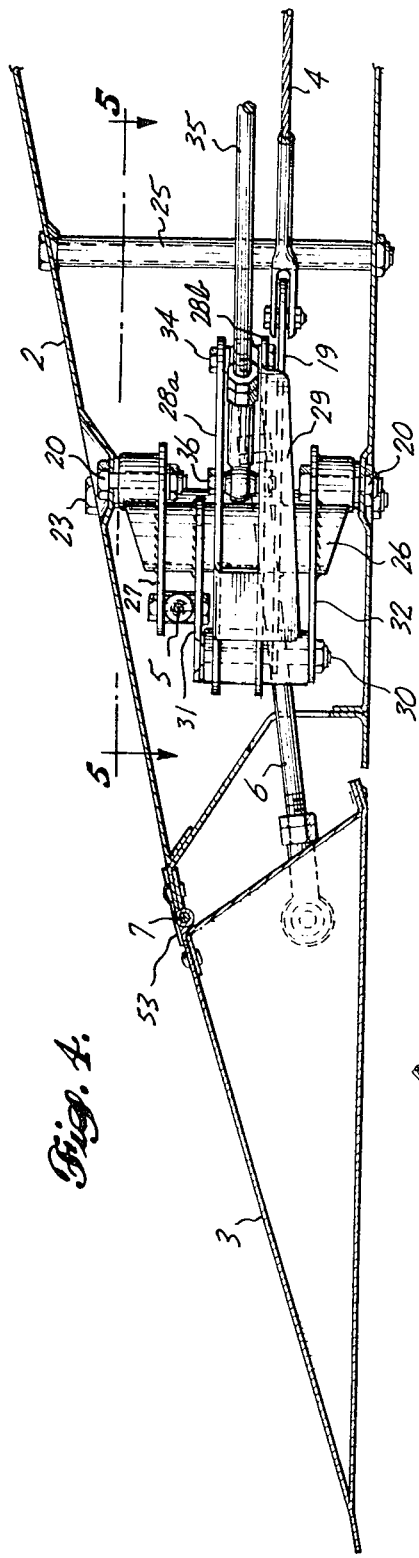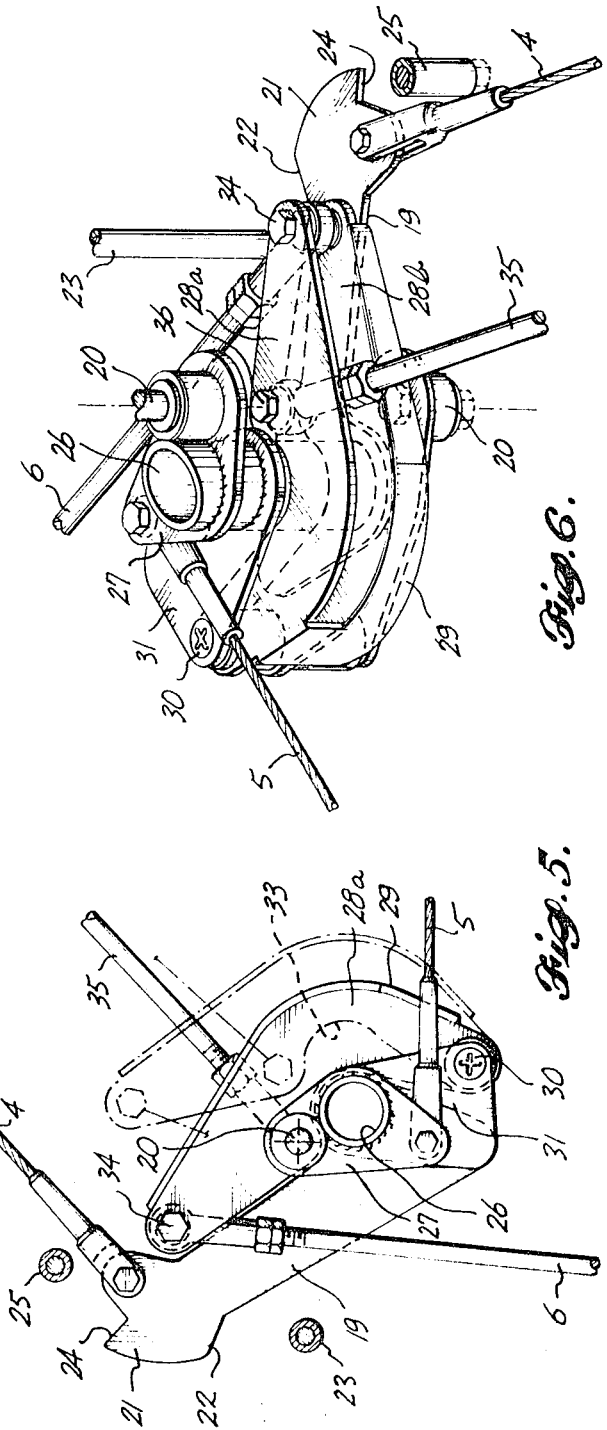

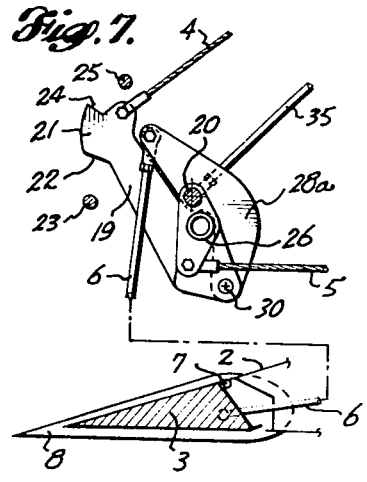
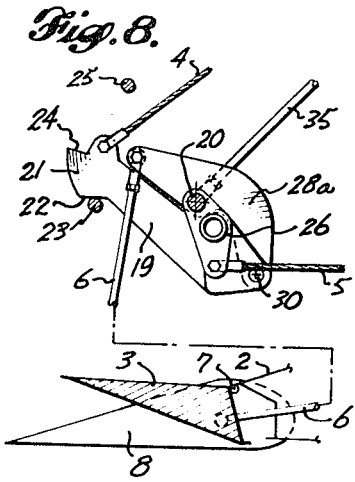
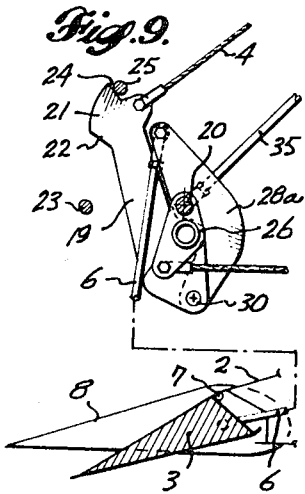
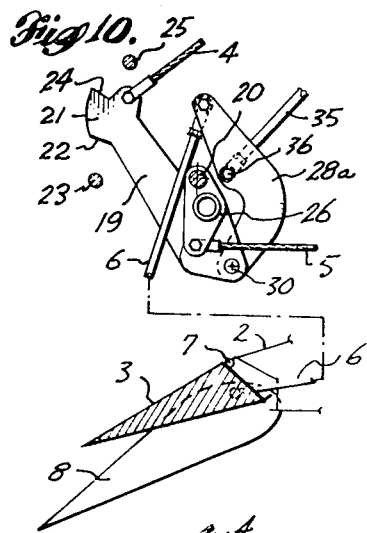
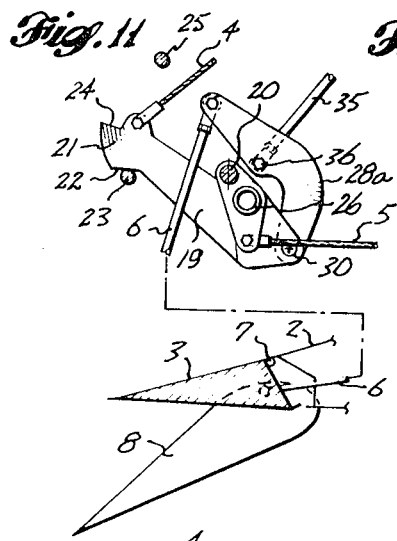
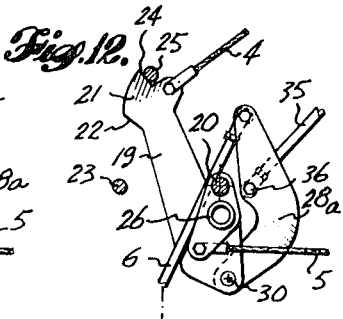
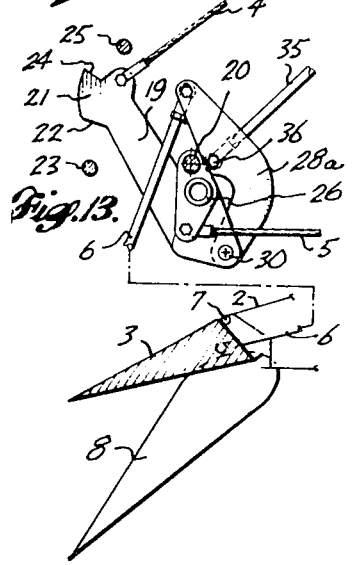
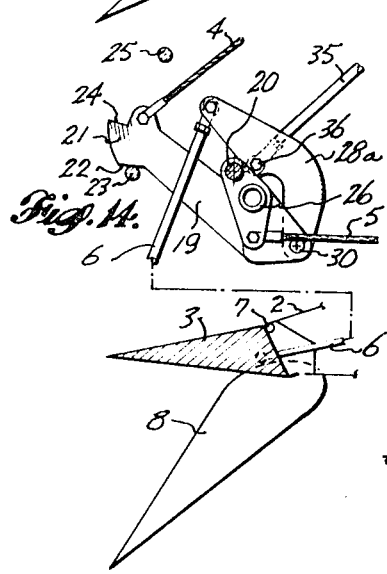
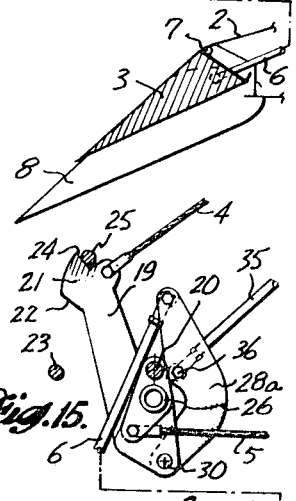
INVENTOR.
JAMES L. ROBERTSON

INVENTOR.
JAMES L. ROBERTSON

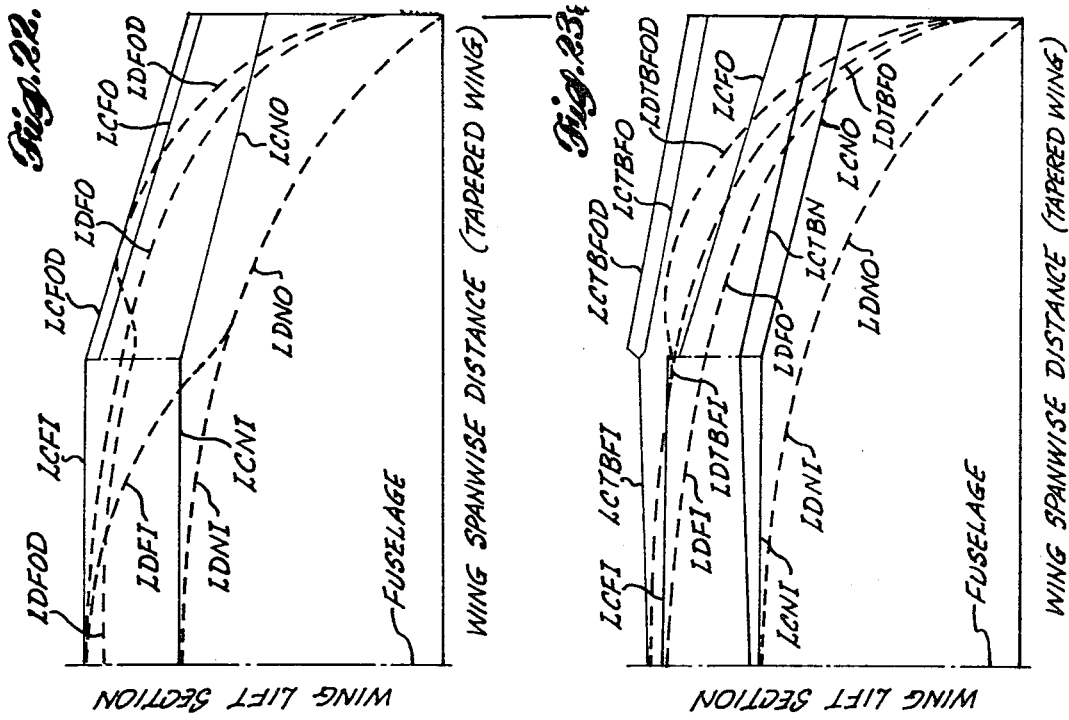
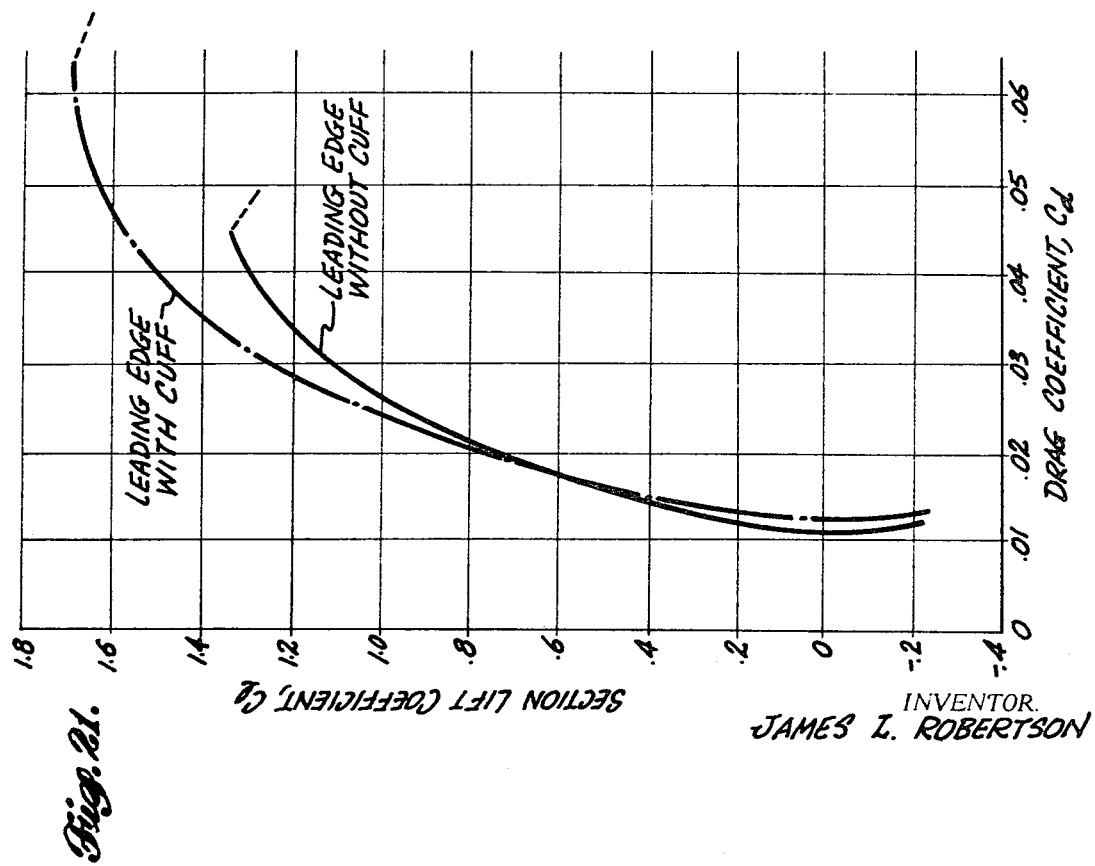

INHERENTLY STABLE TAPERED WING FLAPERON AIRPLANE

This application is a division of U.S. application Ser. No. 730,516, Filed May 20, 1968, now U.S. Pat. No. 3,539,133.

It is a principal object of the present invention to provide an airplane construction which will enable the airplane to take off and to land at low speeds and in short distances without requiring extra or excessively complicated high-lift devices. The speed of such an airplane can also be reduced when flying through turbulence and is capable of being controlled and maneuvered easily and safely at relatively low speeds, including the ability to make tight turns.

More specifically, it is an object to provide such an airplane equipped with flaperons and flaps in which the droop setting of the flaperons is coordinated with the deflection of the flaps so as to produce nearly maximum lift capability of the airplane without excessive drag during takeoff of the airplane, and somewhat greater lift capability, permitting minimum speed of the airplane, with maximum controllability during landing, although the drag is somewhat greater than for takeoff conditions. Particularly, it is desirable to provide effective turn-and-roll control of such an airplane at high angles of attack during landing despite its greatly improved lift capability for any given speed.

It is also an object to provide an airplane having a high stalling angle and one which will not stall abruptly nor which, during a stall, will inadvertently execute an uncontrollable spin or roll. If a stall does occur, the airplane can recover quickly without appreciable loss of altitude by the pilot exercising minimum control action, even limited to use of the flaperons alone.

Another object is to provide an airplane which will have rapid climbing ability resulting from the use of a high-lift wing without excessive increase in drag. An incidental object is to distribute the wing loading uniformly over the wing and, thus, reduce the drag by coordinating droop of the flaperons and deflection of the flaps.

It is also an object to attain the foregoing objects, including controllability and maneuverability of the airplane, without increasing the complexity of the control manipulations which must be effected by the pilot. In fact, in a landing approach, flare of the airplane under control of the pilot is facilitated.

A further object is to accomplish the foregoing objects without reducing the high-speed capability of the airplane and, in fact, the high-speed characteristics of the airplane may even be improved.

An additional object is to provide such an airplane or to modify an existing airplane to improve its characteristics in the respects discussed above without significantly increasing the weight of the airplane and at modest expense.

FIG. 1 is a top perspective of front and rear portions of an airplane angularly displaced and having portions broken away to reveal internal structure.

FIGS. 2 and 3 are diagrammatic illustrations of coordinated flaperon and flap actuators showing parts in different adjusted positions.

FIG. 4 is a longitudinal vertical section through the trailing portion of a wing and a flaperon showing actuating mechanism for the flaperon.

FIG. 5 is an enlarged plan of a portion of the flaperon-actuating mechanism.

FIG. 6 is a top perspective of the portion of the flaperon-actuating mechanism shown in FIG. 5.

FIGS. 7 to 15, inclusive, are operational diagrams of flaperons, flaps and flaperon-actuating mechanism illustrating various relative positions of a flaperon and flap corresponding to positions of the flaperon control mechanism.

FIGS. 16 and 17 on sheet 1 of the drawings are fragmentary longitudinal vertical sections through landing portions of the wing shown in FIG. 1, taken on lines 16—16 and 17—17, respectively, of that figure.

Figure 18:
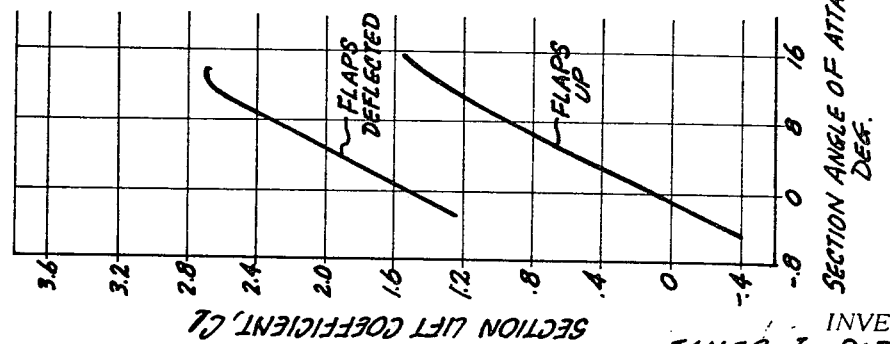

FIG. 18 is a graph showing lift curves of a conventional airfoil having flaps.

Figure 20:
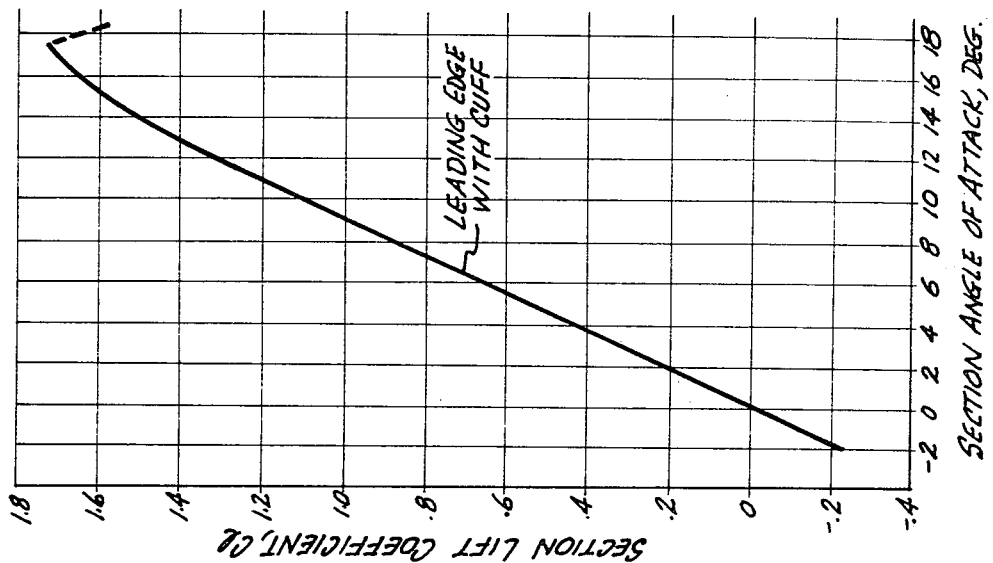
Figure 19:
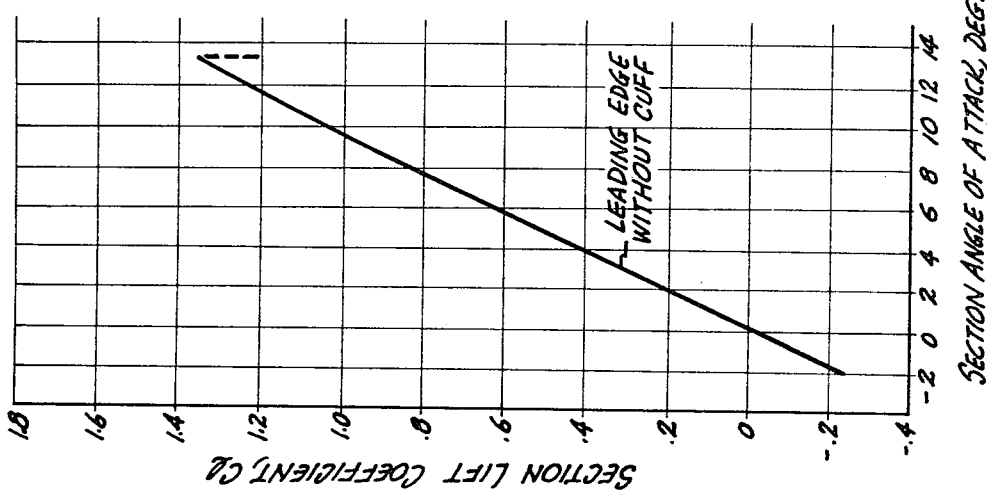

FIGS. 19 and 20 are graphs showing comparative lift curves for airfoils having two different types of leading edge configurations.

FIG. 21 is a graph showing comparative lift-drag curves for the two types of airfoil having leading edges corresponding to the curves of FIGS. 19 and 20.

FIG. 22 is a graph illustrating characteristics of a wing semispan having a relatively sharp leading edge with lift characteristics as indicated by FIG. 19, and FIG. 23 is a comparable graph for a wing having a blunt and rounded leading edge with lift characteristics such as indicated in FIG. 20.

While the present invention could be incorporated in the original design and construction of the airplanes, the structural changes embodied in the present invention over conventional airplane are sufficiently minor so that it is quite practical to modify a previously constructed conventional airplane to incorporate in it the features of the present invention. In order to accomplish such a conversion economically, however, it would be necessary that the conventional airplane to be modified be equipped with both ailerons and trailing edge flaps between the ailerons and the fuselage. Thus, the airplane shown in FIG. 1 has a fuselage 1 on which the wings 2 are mounted as a high-wing monoplane.

On the trailing portions of the outboard panels of wings 2 are mounted what appear to be ailerons 3 that can be deflected differentially by the usual control cables 4 and 5. Such cables effect lengthwise reciprocation of a fore-and-aft push-pull link 6 connected to the aileron below its hinge axis as shown best in FIG. 4. Such control cables, link and aileron installation as thus far described are conventional. The aileron is mounted on the wing by spanwise spaced hinges 7, the axis of which is located substantially in the upper surface of the wing.

Inboard of the ailerons 3 flaps 8 are mounted on the trailing portion of the wing. These flaps are depressed by control cables 9 and 10 encircling pulleys 11. Rotation of such pulleys reciprocates lengthwise thrust links 12 extending fore-and-aft and connected between such pulleys and the respective flaps. Such flaps and flap-actuating mechanism are conventional. Also, the empennage of the airplane mounted on the rear of the fuselage 1 is conventional. It includes the vertical fin 13 and rudder 14 and the horizontal stabilizers 15 and elevators 16. The starboard elevator may have a controllable trim tab 17 which can be swung by the pilot independently of the control column. In the connection between the control column and the elevators 16 down-springing mechanism 18 may be incorporated to load the elevators downward so as to increase the longitudinal stability of the airplane.

While the control surface 3 has been referred to above as an aileron, such control surface for the purpose of the present invention is a flaperon. Such control surface may be installed in the airplane as originally constructed as a flaperon, or the ailerons can be converted to flaperons in the modification of a previously constructed airplane for the purpose of embodying the present invention in such airplane. In either case, the actuating mechanism provided in the present invention to deflect the flaperon includes a jaw crank shown best in FIGS. 4, 5 and 6.

Such jaw crank includes a supporting jaw 19 which is mounted for swinging about a fixed upright axis relative to the wing 2 by pivots 20. Such jaw can be swung in opposite directions by the control cables 4 and 5 connected to it at opposite sides of such pivot, respectively. Swinging of such jaw will effect differential deflection of the flaperons, one up and one down, to effect roll control of the airplane. The extent of deflection of the flaperons thus effected is limited by interrupting travel of the projection 21 on jaw 19. Upward deflection of a flaperon is limited by the side 22 of projection 21 abutting a stop rod 23 anchored to the airplane wing 2 and downward deflection of the flaperon for aileron control is limited by engagement of the shoulder 24 with the fixed stop rod 25.

The jaw 19 is integrated with the pivots 20 through a tube 26 to which the jaw is welded. The upper pivot part is connected to an upper plate 27 which is also welded to such tube and the control cable 5 is directly pivoted to such upper plate. A supported jaw of the crank includes upper and lower superimposed plates 28a and 28b which are secured together by a plate 29 of angle shape providing a flange projecting downward from the lower plate 28b. Such supported jaw is mounted on supporting jaw 19 for swinging relative to it about an upright axis by a pivot 30.

Pivot 30 is mounted on jaw 19 between an upper plate 31 and a lower plate 32 between which the supported swinging jaw 28a, 28b is received. These plates are integrated with the supporting jaw by tube 26 extending through apertures in them and being welded to such plates. The lower pivot 20 is carried by the lower plate 32. The upper and lower plates 28a and 28b of the supported jaw have notches 33 in their edges adjacent to the supporting jaw located to embrace tube 26 when the supported jaw is swung toward the supporting jaw so that the jaws may be disposed in the closed relationship shown in FIGS. 2 and 5.

The thrust link 6 has one end connected to the flaperon 3 and its other end is connected to the supported swinging jaw 28a, 28b by pivot 34 at a location remote from the pivot 30 mounting the supported jaw on the supporting jaw. Consequently, link 6 will be shifted lengthwise by swinging of the supported jaw relative to the supporting jaw about pivot 30. Such swinging of the supported jaw is accomplished by lengthwise movement of a link 35 connected to the supported jaw by pivot 36. Such pivot is mounted on the supported jaw so that when the jaws are in the closed relationship shown in FIGS. 2 and 5, the axis of pivot 36 will coincide with the axis of pivot 20 on which the supporting jaw 19 turns for effecting aileron control deflection of the flaperons.

Link 35 extends from supported jaw 28a, 28b generally perpendicular to the length of such jaw and the length of the supporting jaw 19. To hold link 35 in such position, its end remote from the supported jaw is connected to a plate crank 37 by a pivot 38. Such crank is mounted to turn about a stationary axis by pivot 39. A further link 40 is connected to the plate crank 37 by a pivot 41 located at the side of the plate pivot 39 opposite pivot 38 of link 35. The end of link 40 remote from crank 37 is connected to another crank 42 by a pivot 43 offset from a pivot 44 which mounts the crank for swinging about a stationary axis. A further link 45 is connected to crank 42 by a pivot 46 which is shown as being located at the side of crank pivot 44 generally opposite link pivot 43, but the position of this pivot depends on the structure of the flap-operating mechanism. The end of link 45 remote from crank 42 is connected to one arm of a bell crank 47 by a pivot 48. Such bell crank is secured to pulley 11 and swings about the axis of pivot 49 which mounts both the bell crank and such pulley. The thrust link 14 connected to the flap 8 is secured to the other arm of bell crank 47 by pivot 50.

The actuating mechanism described above serves the dual purpose of effecting droop of the flaperons 3 coordinated with deflection of the flaps 8 while enabling aileron control deflection of the flaperons to be effected without significant movement of the linkage connecting the flaperons and the flaps. When the actuating mechanism connecting the flaperons and the flaps is in the position shown in FIG. 2, the supported jaw 28a, 2b and the supporting jaw 19 are in the closed position shown in that figure in which the axis of pivot 36 attaching link 35 to the supported jaw coincides with the axis of pivot 20 mounting the supporting jaw.

With the parts of the actuating mechanism in the position shown in FIG. 2, the control cables 4 and 5 can be manipulated in the usual way to swing the supporting jaw 19 about the axis of pivots 20 and 36. Because of the coincidence of the axes of such pivots, the supporting jaw and the supported jaw will be swung as a unit by manipulation of cables 4 and 5 without moving link 35 at all. Such swinging of the jaw crank 19, 28a, 28b between the extreme broken line positions shown in FIG. 2 will effect corresponding aileron movement of the flaperons independent of their drooping. Such aileron movement resulting from swinging of the jaw crank in this fashion is illustrated in FIGS. 7, 8 and 9. In FIG. 7 the jaw crank and the flaperon are shown in neutral position with the flap 8 undeflected. In FIG. 8 the jaw crank has been swung to the extreme position in which the flaperon is fully deflected upward. In FIG. 9 the jaw crank has been swung to the opposite extreme position in which the flaperon has been swung into its limiting depressed position when the neutral setting of the flaperon has not been shifted.

If the control cables 9 and 10 for setting the deflection of the flaps 8 are shifted to rotate pulley 11 from the position of FIG. 2 to the position of FIG. 3 in a clockwise direction, the flap-actuating thrust link 12 will be moved lengthwise to swing the flap down through an angle of approximately 25°. Such movement of the pulley 11 and bell crank 47 will draw link 45 from the position of FIG. 2 to the right into the position of FIG. 3. By such movement crank 42 will be swung until the line joining its pivot 44 and pivot 43 of link 40 are in alignment with such link. Swinging of crank farther in a clockwise direction will result in over center movement of pivot 43 so that beyond that position link 40 will be drawn to the right instead of being pushed to the left as it is during swinging of lever 42 between the position shown in FIG. 2 and that of FIG. 3.

Lengthwise movement of link 40 toward the left from the position of FIG. 2 toward the position of FIG. 3 will effect swinging of crank plate 37 in a counterclockwise direction above the axis of its pivot 39. Such movement will produce a pulling force on link 35 which, consequently, will effect swinging of the supported jaw 28a, 28b of the jaw crank from the position of FIG. 2 to that of FIG. 3. If, during such movement of link 35, jaw 19 has been held stationary in the position shown in FIGS. 2 and 3, swinging of the supported jaw 28a, 28b effected by movement of link 35 as explained above will provide the only cause for movement of the flaperons. The supported jaws of the jaw cranks at both sides of the airplane will be swung relative to their respective supporting jaws to the same degree. Such movement will pull links 6 and deflect both flaperons 3 downwardly correspondingly to the same degree as illustrated in FIGS. 3 and 10.

It will be evident that the actuating linkage disclosed in FIGS. 2 and 3 interconnects the flaps 8 and the flaperons 3 and synchronizes the deflection of the flaps with droop of the flaperons. When the actuating linkage is in the position of FIG. 2, neither the flaperons nor the flaps are deflected as indicated by their positions in FIGS. 2 and 7. As the flaps are deflected the droop of the flaperons will be increased progressively correspondingly until when the actuating linkage has reached the condition of FIG. 3, the flaps will have been deflected 25°, for example, while the flaperons have drooped 15° to the positions illustrated in FIGS. 3 and 10. During movement of the linkage between the positions of FIG. 2 and the position of FIG. 3, link 45 will have moved lengthwise to the right and link 40 will have moved lengthwise to the left. If the flap-actuating pulley 11 and bell crank 47 continued to turn in the clockwise direction beyond the position of FIG. 3, however, link 45 will continue to move lengthwise to the right, but link 40 instead of continuing its lengthwise movement to the left actually will begin to move to some extent to the right because the axis of pivot 43 has crossed the position in which link 40 is aligned with pivot 44 of crank 42.

Lengthwise movement of link 40 to the left in FIGS. 2 and 3 effects progressively greater opening movement of the jaws of the jaw crank connected to the flaperons until such jaws have reached the relationship shown in FIGS. 3 and 10. Such full open relationship of the crank jaws corresponds to maximum droop of the flaperons even through such droop is less than the deflection of the flaps. Movement of link 40 back to the right in FIG. 3 effected by continued swinging of crank 42 in the clockwise direction will move the supported jaw 28a, 28b in the closing direction to push link 6 for decreasing the droop of the flaperons. By the time that the flaps have reached their fully deflected position of FIG. 13, which may be approximately 40°, the droop of the flaperons will have been decreased to some extent, such as from approximately 15° to approximately 13°. The movement of the droop setting linkage shown in FIG. 3 to accomplish such reduction in flaperon droop is illustrated in the broken lines shown in FIG. 3.

Whatever may be the droop setting of the flaperons effected by the linkage shown in FIGS. 2 and 3, aileron roll control movement of the flaperons can be effected by movement of the aileron control cables 4 and 5 to swing the supporting jaw 19 of the jaw crank. FIGS. 10, 11 and 12 illustrate the movement of the flaperon and its actuating jaw crank when such crank is swung by the aileron cables with the droop setting linkage in the full-line position shown in FIG. 3. As the supporting jaw 19 is swung counterclockwise by the cables 4 and 5 from the position of FIG. 10 to that of FIG. 11, the thrust link 6 will be moved lengthwise aft to deflect the flaperon upward through an angle of approximately 16° from the neutral position of FIG. 10. Conversely when the control cables 4 and 5 are manipulated to swing the supporting jaw clockwise to the position of FIG. 12, the thrust link 6 will have been moved lengthwise forward to deflect the flaperon 3 downward approximately 11° from the neutral position of FIG. 10.

As the jaw crank is swung by the aileron control cables 4 and 5 from the position of FIG. 10 to the positions of FIGS. 11 and 12, the pivot 36 connecting link 35 to the supported jaw 28a, 28b does not coincide with pivot 20. It will be seen from FIGS. 11 and 12, however, that the orbital movement of pivot 36 about the axis of pivot 30 is transversely of the length of rod 35 so that this rod is simply swung to a slight degree and is not reciprocated lengthwise. Consequently, the amount of droop of the flaperon is not altered appreciably by swinging of the jaw crank. Consequently, for aileron purposes the flaperon is deflected above and below its maximum droop neutral position of FIG. 10 to very nearly the same extent as the flaperon is deflected for aileron control purposes when it has no droop, as in FIGS. 7, 8 and 9.

When the flaps 8 have been deflected fully, as illustrated in FIGS. 13, 14 and 15, the aileron control cables 4 and 5 can still be manipulated to swing the jaw crank for effecting aileron control movement of the flaperons. Such movement of the flaperons for aileron roll control purposes will be similar to and accomplished in the same manner as described in connection with FIGS. 10, 11 and 12. In the positions of FIG. 12 and 15, the additive downward deflection of the flaperon for roll control purposes and the droop setting of the flaperon is approximately 26°. For all aileron operation, therefore, when the droop of the flaperons is maximum, the maximum deflection of a flaperon will be approximately the same as the deflection of the flap. In FIG. 15 the droop of the flaperon is not quite as much as the droop of the flaperon in FIG. 12, but the possible aileron control deflection of the flaperon both upward and downward from the neutral position is somewhat greater for the condition of FIG. 15 than for that of FIG. 12. Also, a given aileron control deflection is more effective when the flaperon has less droop.

It will be seen, therefore, that to whatever degree the flaperons may droop, they are still capable of adequate aileron control up-and-down deflection from the neutral drooped position. In order to obtain proper roll control, however, it is not sufficient simply to provide for adequate movement of the flaperons, but such movement must provide sufficiently effective aerodynamic reactions to produce the necessary control forces on the airplane. Whether such forces are produced depends not only upon the movement of the control surfaces but upon the lift characteristics of the resulting wing profile and the planform and the distribution of the lift over the wing.

As shown in FIG. 1, the present invention is applied to the wing of an airplane having an outboard panel ahead of the flaperon that is tapered in planform. Consequently, as shown in FIG. 22, the wing section lift capability of such outboard wing panel, curve LCNO (lift capability normal outboard), and the distribution of lift on such panel, curve LDNO (lift distribution normal outboard), are less than the lift capability of the wing panel inboard from the inboard end of the aileron represented by curve LCNI (lift capability normal inboard) and the lift distribution on such inboard wing panel shown by curve LDNI (lift distribution normal inboard). When the flap 8 is deflected the lift capability of such inboard portion of the wing is increased greatly, curve LCFI (lift capability flap inboard), but the stalling angle of this portion of the wing is not increased, as indicated by the graph of FIG. 18. When the control surface 3 is of the flaperon type and is drooped conjointly with deflection of the flap, the lifting capability of the outboard wing portion also greatly increased, such as from the curve LCNO to the curve LCFO (lift capability flaperon outboard), as shown in FIG. 22. The increased lift produced by drooping the flaperons, like the increased lift produced by deflecting the flaps, does not appreciably increase the stalling angle.

Deflection of the flap along increases the area under the lift distribution curve to the curve LDFI (lift distribution flap inboard) for the inboard panel without appreciably changing the outboard portion of curve LDNO. When the flaperon is drooped simultaneously with deflection of the flap, however, the entire lift distribution curve is changed to the curve LDFO (lift distribution flap outboard) of FIG. 22. It will be noted that the lift distribution curve LDFO approaches very close to the curve LCFO, representing the outboard wing panel lift capability with the flaperon drooped. Stalling occurs at any location along the wing where the lift distribution curve touches the lift capability curve for the same flight conditions. Consequently, further downward deflection of a drooped flaperon from neutral position, such as from the position of FIG. 10 to the position of FIG. 12, for the purpose of effecting roll control, tends to produce earlier stalling in the tapered outboard wing panel than in the inboard wing panel.

With the conventional type of airfoil shown in FIGS. 16 and 17, without the cuff being added, therefore, during level flight when the flaps are raised, the lift capability curve LCNO and the lift distribution curve LDNO are not in close proximity ahead of the flaperon, so that there is no danger of stalling occuring in the outboard wing panel when an undrooped flaperon is deflected downward for roll control purposes. Also, when the flaps are deflected there is no great danger of an inadvertent wing tip or outboard panel stall resulting from downward deflection of an undropped flaperon because the lift distribution curve LDFI-LDNO and the lift capability curve LCFI-LCNO have the same separation as before forward of the flaperon. Such flaperon control deflection can produce an effective increase in lift for roll control because of the resulting improved lift coefficient, which is comparable to the effect of flap deflection as indicated by comparing the two curves of FIG. 18.

Control difficulties arise, however, where flaperons are used on a conventional wing having a relatively sharp leading edge and such flaperons are deflected for control purposes after being drooped in conjunction with deflection of the flaps, as shown in FIG. 12. Under such circumstances the lift capability curve of the outboard wing panel is increased somewhat to the curve LCFOD (lift capability flaperon outboard deflected), but the lift distribution curve is increased more, to the curve LDFOD (lift distribution flaperon outboard deflected). As mentioned above, the lift distribution curve LDFO is quite close to the maximum lift capability curve LCFO, as shown in FIG. 22, without the flaperon being deflected. When a flaperon is swung downward from its neutral drooped position of FIG. 10 to the position of FIG. 12, stalling will occur first in the outboard wing panel, as indicated by the lift distribution curve LDFOD touching the lift capability curve LCFOD in FIG. 22.

Because of the initial increase in lift afforded by the flaperon in being deflected downward from its drooped position, the wing will begin to rise to effect a rolling maneuver of the airplane. As stalling occurs in the outboard wing panel, however, the lift produced by such panel will be reduced abruptly, causing the wing to drop. Since the pilot is powerless to restore the lift in the outboard wing panel with the flaperon deflected downwardly from its neutral drooped position, the direction of roll of the airplane will be reversed and the airplane will execute an uncontrolled roll, and possible resulting spin, in the sense opposite the rolling movement initiated by the pilot.

In the present invention, it has been found that if the leading portion of the outboard wing panel ahead of the flaperon 3, which wing panel is tapered in planform, has a blunt and rounded leading edge portion and that leading edge portion is more blunt and rounded than the portion of the wing's leading edge inboard from the flaperon, stalling of the outboard wing panel ahead of the inboard wing panel can be avoided even when the flaperon is deflected downward from its maximum drooped position. The blunt and rounded leading edge portion of the wind can be tapered from the outboard panel toward the fuselage.

Roll maneuverability is preserved by use of a wing having such a high-lift leading edge under slow speed high angle of attack conditions. Such a wing enables lift to be maintained at the high angles of attack produced even when the flaperon is swung downward from its neutral drooped position as shown in FIG. 15. By making the leading edge of the airfoil of blunt and rounded shape, the stalling angle of attack of the wing is increased and the lift coefficient at the stall also is increased substantially, as indicated by a comparison of the curves of FIGS. 19 and 20. The curve of FIG. 19 corresponds to the wing's leading edge profile of FIGS. 16 and 17 without the cuff 51a and 51b, and the curve of FIG. 20 corresponds to the wing's leading edge profile with such cuff. By addition of the cuff the leading edge of the wing is made blunt and rounded and tapers toward the wing root. By such change in leading edge shape the wing lift capability curve can be raised from the curve LCNI-LCNO of FIGS. 22 and 23 to the curve LCTBN (lift capability tapered blunt normal) of FIG. 23. The increase in curve ordinates is greater at the wing tip than toward the wing root because of the taper or decrease in bluntness of the wing's leading edge toward the wing root relative to the wing chord. Also when the flap is deflected and the flaperon is drooped the lift capability curve is raised from the curve LCFI-LCFO of FIGS. 22 and 23 to the lift capability curve LCTBFI-LCTBFO (lift capability tapered blunt flap inboard-lift capability tapered blunt flap outboard) by providing the high-lift leading edge on the outboard wing panel ahead of the flaperon.

When a flaperon is deflected downward from a drooped position with the flap deflected such as shown in FIG. 10 to a position such as shown in FIG. 12, the lift capability curve of the outboard wing panel is raised, such as to the curve LCTB-FOD (lift capability tapered blunt flaperon outboard deflected) shown in FIG. 23. At the same time the lift distribution curve of the wing will have been increased from the curve LDTBFI-LTDBFO (lift distribution tapered blunt flap inboard-lift distribution tapered blunt flaperon outboard) to the curve LDTBFI-LDTBFOD (lift distribution tapered blunt flap inboard-lift distribution tapered blunt flaperon outboard deflected). It will be seen from a comparison of the lift distribution curve LDTBFOD and the lift capability curve LCTB-FOD that there is ample spacing between these curves so that as the angle of attack of the airplane increases the stall will occur first on the inboard panel near the wing root because the spacing between the curves LDTBFI and LCTBFI particularly at the wing root is less than the spacing between any portion of the curves LDTBFOD and LCTBFOD. Consequently, under all flight conditions and for all positions of the flap and flaperon, stalling conditions will occur earliest in the inboard wing panel near the wing root. The controllability of such an airplane is therefore greater because of the lack of stalling characteristics in the outboard panel even with full deflection of the flaperon from a neutral drooped position.

Particularly, where the tapered planform wing has a leading edge the bluntness of which is reduced toward the wing root, any stall which occurs will tend to be initiated at the wing root rather than adjacent to the wing tip. When the stall has spread far enough so that the wing cannot sustain the airplane at the angle of attack which it has assumed, the outboard portions of the wing will still be providing greater lift than the inboard portions. Consequently, the stall will occur in a gentle pitching fashion and without producing any appreciable tendency to cause the airplane to roll. The angle of attack of the airplane will simply be reduced until the speed of the airplane and the wing lift coefficient have increased sufficiently to support the weight of the airplane again. This restoration may occur even without the airplane losing any appreciable altitude.

In applying the present invention to a conventional airplane, the leading edge of the wing can be modified to make it more blunt and rounded by attaching to such leading edge a cuff the rear edges of which are faired into the upper and lower wing surfaces. FIG. 16 shows a cuff 51a applied to a portion of the wing's leading edge inboard of the wing panel ahead of the flaperon and FIG. 17 shows a blunt and rounded cuff 51b applied to the leading edge of the outboard panel ahead of the flaperon. The undersurface of the cuff 51b preferably has a concave portion 51c extending spanwise of the wing immediately rearwardly of the leading edge. Particularly where a cuff such as shown in FIG. 17 is added to a previously constructed wing, it is convenient to terminate the cuff abruptly at a spanwise location corresponding to the outboard end of the flaperon by a cuff and closure plate 52 shown in FIG. 1.

The cuffs 51a and 51b shown in FIGS. 16 and 17 have been applied over a wing leading edge of conventional contour. In the outboard panel of the wing ahead of the flaperon the leading edge of the wing is of cylindrically arcuate shape in which the radius is within the range of 2.2 to 4.0 percent of the wing chord at each spanwise location if the wing has a maximum thickness to chord ratio of about 12 percent. Preferably the radius of the leading edge curvature is approximately 2.5 percent of the wing chord. At the root of the wing the radius of the leading edge may be between 1 and 2.5 percent of the wing chord, a preferred value being approximately 2.0 percent of the wing chord. The ratio of wing leading edge radius to wing chord is substantially greater ahead of the flaperon than at the wing root. Throughout the wing span the ratio of leading edge radius to the wing chord is from 1 to 4 percent if the maximum thickness to chord ratio of the wing is approximately 12 percent. If the thickness of the wing is appreciably greater than this proportion, the radius of curvature of the leading edge should be increased still further.

Stating the matter in another way, the leading edge of the airfoil should be selected so that the wing profile with the flaps and flaperons undeflected will provide a lift coefficient exceeding 1.5 and will have a stalling angle exceeding 15° angle of attack. In FIG. 19 a lift coefficient graph for a wing having a leading edge like that of FIGS. 16 and 17 without the cuff is shown. This curve is for an NACA airfoil having maximum thickness to chord ratio of 12 percent. The maximum lift coefficient is indicated as being 1.35 and the stalling angle is 13°. It is important that for the purpose of the present invention the basic airfoil have high lift and large stalling angle characteristics. FIG. 20 shows a lift coefficient curve for an airfoil having a leading edge profile such as provided by the cuffs shown in FIGS. 16 and 17 and, particularly, that shown in FIG. 17. The lift maximum coefficient is 1.7 and the stalling angle is 17°. It is important that such a high-lift leading edge profile be utilized for the outboard panel of the wing ahead of the flaperon particularly where the wing is tapered in planform.

Because the flaperon when combined with a high-lift wing leading edge ahead of it can still produce increased lift when it is deflected downward from its neutral drooped condition, the pilot has the ability to roll the airplane at will by manipulating the control column in conventional fashion. It is, therefore, very desirable to be able to preserve the lifting capability of the flaperon at very high angles of attack. The lifting capability of such a downwardly deflected flaperon can be improved further by providing sealing strips 53 shown in FIGS. 1 and 3 in particular. Where the flaperon hinge is located so that its axis is adjacent to the upper surface of the wing, as shown in FIG. 4, a slot may open up between the hinges at flaperon angles of the order of 20° unless special sealing means are provided for sealing such slots.

If the flaperon slots are not closed, air can pass from the high pressure region beneath the wing through the slot to the low pressure region above the wing to reduce the lift effectiveness of the wing. Such reduction in lift effectiveness produces a corresponding reduction in roll maneuverability of the airplane.

Utilization of such slot-sealing strips is particularly advantageous where a previously constructed airplane is being modified by application of the present invention to it. In an airplane originally designed to incorporate the present invention, the wing trailing edge and flaperon leading edge could be designed to be disposed in closely adjacent relationship irrespective of the extent of deflection of the flaperon. Where a flaperon is substituted for an aileron, however, the flaperon will be deflected through a much greater angle from neutral undrooped position than the aileron would be deflected as used in a conventional airplane. The maximum deflection of the flaperon could be of the order of 26° whereas the maximum downward deflection of an aileron would be in the order of 12° to 16°.

A further advantage in maneuverability of the airplane at high angle of attack conditions is gained by not maintaining a direct relationship between the deflection of the flaps and the droop of the flaperons. During take-off, because of the desired rapid acceleration of the airplane, it is preferred that the flap not be fully deflected. Thus, if the flap can be deflected as much as 40° from neutral, it would probably be deflected approximately 25° for take-off purposes. While the lift produced by the wing with the flap at such an angle is less than would be produced by the wing with the flap fully deflected, the drag of the wing with the flap at the smaller angle of deflection is decreased from the drag of the wing with the flap fully deflected to a much greater proportion than the proportionate reduction in lift. As has been explained above, the mechanism provided by the present invention can produce maximum droop of the flaperons when the flaps have been deflected 25°. Such droop of the flaperons increases the available wing lift of the outboard wing panels so as to provide a high-lift wing for rapid ascent without correspondingly increasing the wing drag. At the same time, because of the combination of the flaperons and the high-lift wing leading edge ahead of the flaperons, adequate roll maneuverability of the airplane is maintained.

On the other hand, during landing of the airplane, a braking effect as well as high lift is desired. A fully deflected flap will produce slightly increased wing lift and the increase in drag will be proportionately greater than the increase in lift. In order to enable the wing to produce this effect, the droop of the flaperon corresponding to full flap deflection can be somewhat less than the droop when the flap is only partially deflected. By thus reducing the droop of the flaperon when the flap is fully deflected, the flaperon can be deflected upward and downward from its neutral drooped position through a greater angle for producing more effective roll maneuvering at substantially minimum air speed during landing.

In order to provide maximum controllability of the airplane, it is important that the outboard panels of the wing ahead of the flaperons not be subjected to stall conditions before a stall occurs at a farther inboard location of the wing. The provision of the blunt and rounded high-lift leading edge for the wing, as shown in FIG. 17, contributes to this result particularly where the outboard panel of the wing is tapered in planform. With such a wing, even when the flaperon is fully deflected, wing stall tends to be initiated near the wing root. As the angle of attack of the airplane increases thereafter, the stall will be extended outboard. In order further to deter migration of the stall to the outboard wing panels ahead of the flaperons, a fence 54, as shown in FIG. 1, is provided on the wing extending chordwise at approximately the location of the inboard end of the flaperon. The trailing end of such fence is located adjacent to the leading edge of the flaperon and the fence may taper forward to some extent, its greatest height in the range of 7 to 12 percent of the wing chord.

As has been discussed above, a blunt and rounded leading edge, particularly on the outboard panel of a wing tapered in planform, in combination with flaperons will enable wing lift to be produced effectively at much higher angles of attack than would otherwise be the case. Also, because of the increase in lift coefficient and maintenance of maneuverability, it is entirely feasible to fly the airplane at such high angles of attack and correspondingly slower speeds particularly when landing. It is therefore desirable to facilitate the airplane being flared to such high angle of attack condition preparatory to landing. At least in some airplanes, the elevator controls are provided with down-spring mechanism 18 tending to nose the airplane downward at low speeds and opposing efforts of the pilot to pull the control column rearwardly for nosing the airplane upward. While it is still desirable to have such a downward spring loading on the elevators when the airplane is in normal cruising flight for stability purposes, it has been found to be advantageous in connection with the present invention to reduce the effective down-spring load, or apply a resilient upward load, on the elevators when the flaps have been deflected and the flaperons have been drooped to increase the lift characteristics of the airplane wings. By the application of such a spring force the pulling effort which the pilot must exert on the control column is reduced automatically without the pilot being required to retrim the airplane by adjustment of the trim tab.

During take-off and landing, the attention of the pilot must be directed to various factors which do not need attention during normal flight of the airplane. These include retraction or projection of the landing gear, effecting flap retraction or deflection, checking air speed, receiving and acknowledging radio take-off or landing instructions, and particular attention to traffic, wind direction indication, and throttle and flight controls. Consequently, it is very undesirable to add another item to which the pilot must devote his attention during take-off or landing. In the present invention, therefore, arrangements are made to apply a resilient up load on the elevators which will oppose a down-spring loading on the elevators or a downward force produced by gravity or by aerodynamic loading, automatically in response to deflection of the flaps. Such upward force can be effected either by reducing the stress produced in the elevator control system by a down-spring load-applying mechanism, or by counteracting some of the force produced by a down-spring loading mechanism or by simply providing a lifting effort for the elevators by supplying spring means which will supplement the effort on the elevator control system produced by the pilot in swinging the control column rearward.

In FIG. 1 a cable 55 extending fore and aft of the airplane fuselage 1 is shown as being connected to the down-spring loading mechanism 18 for the elevators 16. Whatever pull is exerted on the cable 55 will reduce correspondingly the effort which the pilot must exert to swing the control column rearwardly for raising the elevators 16. To accomplish the results described above, compensating means to produce a forward pull on the cable 55 includes a pair of springs 56 attached to such cable. The anchor point of such springs is shifted in response to deflection of the flaps 8 by pulling on cable 57. One end of such cable is secured by a clamp 58 to one of the flap-actuating cables 9 and 10 so that when such flap-actuating cable is moved to depress the flaps, such cable movement will pull the cable 57.

From the end of cable 57 secured to the flap-operating cable by the clamp 58, the cable extends rearwardly appropriately guided by pulleys 59 to a lever 60 mounted by a pivot 61 to swing about a fixed axis adjacent to the springs 56.

The cable 57 can pass from the wing of a high-wing monoplane down through and aft within or along the cabin wall. The aft end of such cable is attached to the lever 61 at point 62 between the lever pivot and the attachment 63 of the springs 56 to such lever. With the attachment points 62 and 63 in such relationship, the spring-attachment point 63 will be moved farther forward than the attachment point 62 of cable 57 for a given angular swing of lever 60. The distances between the lever pivot 61 and the attachment points 62 and 63 determine the relative distances moved by these points as the lever is swung. Such points may therefore be located or altered, as may be desired, to effect the proper degree of movement of the spring anchor point 63 for a given deflection of the flaps 8.

The reduction in effective down-spring load produced by the loading mechanism 18 on the elevators will, of course, depend upon the extent of movement of the spring anchor 63 and the force produced by springs 56 as a result of such movement. An advantage in providing such reduction in down-spring loading on the elevators as the flaps are depressed is that it becomes unnecessary in many cases for the pilot to resort to manipulation of the control for trim tab 17 to produce an upward aerodynamic load on the elevators during a low-speed landing approach. Also, such trim tab undeflected from the plane of the elevator produces an aerodynamic force when moved with the elevator which is more effective to maneuver the airplane than when such tab is swung oppositely for merely producing a force to swing the elevators relative to the airplane. In other words, the trim tab would be swung upward as a part of the starboard elevator when it is swung upward instead of the tab being swung downward relative to such elevator to effect upward elevator movement.

I claim:

1. In an airplane, wings for supporting the airplane, flaperons mounted on the outboard trailing portions of said wings, and flaps mounted on the inboard trailing portions of said wings, the outboard panels of said wings ahead of said flaperons being tapered in planform and having a higher-lift leading edge than the leading edges of the inboard panels of said wings, flap actuating means connected to the flaps for deflecting them, elevators mounted on the airplane aft of the wings, elevator control means connected to said elevators, and compensating means connected to said flap actuating means and to said elevator control means for producing a resilient force on said elevator control means in the direction tending to swing said elevators upward in response to movement of said flap actuating means for deflecting the flaps, the compensation means including spring means operable to decrease a down-springing force of the elevator control means on the elevator.

2. In an airplane, wings for supporting the airplane, flaps mounted on trailing portions of said wings, flap-actuating means connected to said flaps for deflecting them, movable surfaces mounted on the airplane aft of said wings for controlling longitudinal pitch stability, operating means connected to said movable surfaces, and compensating means connected to said flap-actuating means and to said movable surfaces operating means for producing a resilient force on said movable surfaces in the direction tending to swing said movable surfaces upward in response to movement of said flap-actuating means for deflecting said flaps whereby deflection of the flaps automatically provides an assistance force to aid the pilot in raising the movable surfaces during periods of flap deflection.

3. The invention defined by claim 2, said movable surfaces including primary longitudinal pitch control surfaces movable by said operating means and a secondary longitudinal pitch trim control surface attached to the trailing edge of a primary longitudinal pitch control surface for independent movement and providing a force to deflect said primary longitudinal pitch control surfaces upwardly upon independent downward deflection of said trim control surface and wherein said compensating means is interconnected between said flap actuating means and said operating means for providing an upward force on said primary longitudinal pitch control surfaces thus eliminating the need for deflecting the trim control surfaces relative to the primary longitudinal pitch control surfaces with the result that said trim control surface remains aligned with the primary longitudinal pitch control surfaces to provide the maximum effective area of primary longitudinal pitch control surface available to the pilot.

4. The invention defined by claim 2, said wings each including inner panels and outboard panels, said flaps mounted on the inner panels, flaperons mounted on the trailing portions of said outboard panels, sealing strips bridging between the trailing portions of said outer panels of said wings and leading portions of said flaperons for sealing the slot therebetween when said flaperons have been deflected substantially to their positions of maximum deflection.

5. The invention defined by claim 2, said wings each including inner panels and outboard panels, ailerons mounted on the trailing edge of said outboard panels, said flaps mounted on said trailing portions of said inboard panels, and stall fences running along the top of said wing chord-wise between the leading and trailing edges thereof adjacent the inboard ends of said ailerons.

6. The invention defined by claim 2, said wings being tapered in planform and having a leading edge cuff for increasing the radius of the leading edge of the wing, said wings each including inboard panels and outboard panels, said cuff being of a radius of greater percent of chord on outer panels of the wing than the inner panels.

7. In an airplane, wings for supporting the airplane, flaperons mounted on the outboard trailing portions of said wings, flaps mounted on the inboard trailing portions of said wings, flap actuating means connected to the flaps for deflecting them, flaperon actuation mechanism operated in response to deflection of the flaps to increase the droop of the flaperons during deflection of the flaps, sealing strips bridging between the trailing edges of said wings and the leading edges of said flaperons for sealing the slot therebetween, stall fences provided on the wings extending chord-wise at approximately the location of the inboard ends of the flaperons, movable surface means mounted on the airplane aft of said wings for controlling longitudinal pitch stability, primary pitch control means connected to said movable surface means for actuating said movable surface means, and compensating means interconnected to said flap actuating means and to said primary pitch control means for providing a resilient force on said primary pitch control means in the direction tending to swing said movable surface means upward in response to movement of said flap actuating means for deflecting the flaps whereby deflection of the flaps automatically provides an assistance force to aid the pilot in raising the longitudinal pitch stability movable surface means during periods of flap deflection.

8. In an airplane, wings for supporting the airplane, flaps mounted on trailing portions of said wings, flap-actuating means connected to said flaps for deflecting them, primary longitudinal pitch control surfaces mounted aft of said wings, a secondary longitudinal pitch trim control surface attached to the trailing edge of a primary longitudinal pitch control surface for providing an assistance force to aid deflection of said surfaces in the opposite direction, compensating means interconnected to said flap actuating means and said pitch control surfaces for providing an upward force on said pitch control surfaces upon downward deflection of said flaps to automatically provide an assistance force aiding the pilot in raising the pitch control surfaces and allowing the trim control surface to remain in alignment with the pitch control surfaces so that the maximum effective area of primary longitudinal pitch control surface is available to the pilot.

9. The invention of claim 8, said compensating means including resilient spring means.

* * * * *